J. L. ROWLAND.
Manufacture of Artificial Stone.

No. 137,322. Patented April 1, 1873.

2 Sheets--Sheet 2.

J. L. ROWLAND.
Manufacture of Artificial Stone.

No. 137,322. Patented April 1, 1873.

UNITED STATES PATENT OFFICE.

JAMES L. ROWLAND, OF MILWAUKEE, WISCONSIN.

IMPROVEMENT IN THE MANUFACTURE OF ARTIFICIAL STONE.

Specification forming part of Letters Patent No. 137,322, dated April 1, 1873; application filed November 26, 1872.

*To all whom it may concern:*

Be it known that I, JAMES L. ROWLAND, of Milwaukee, in the county of Milwaukee and State of Wisconsin, have invented an Improvement in the Manufacture of Stone Artificially; and I do hereby declare that the following is a full, clear, and exact description thereof, reference being had to the accompanying drawing, in which—

Figure 1:
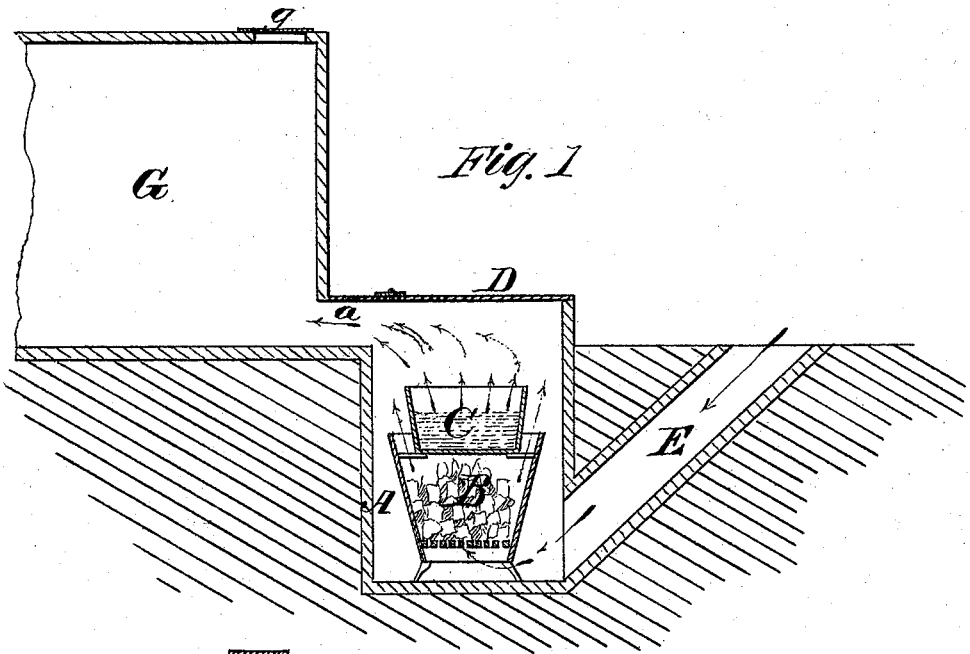
Figure 2:
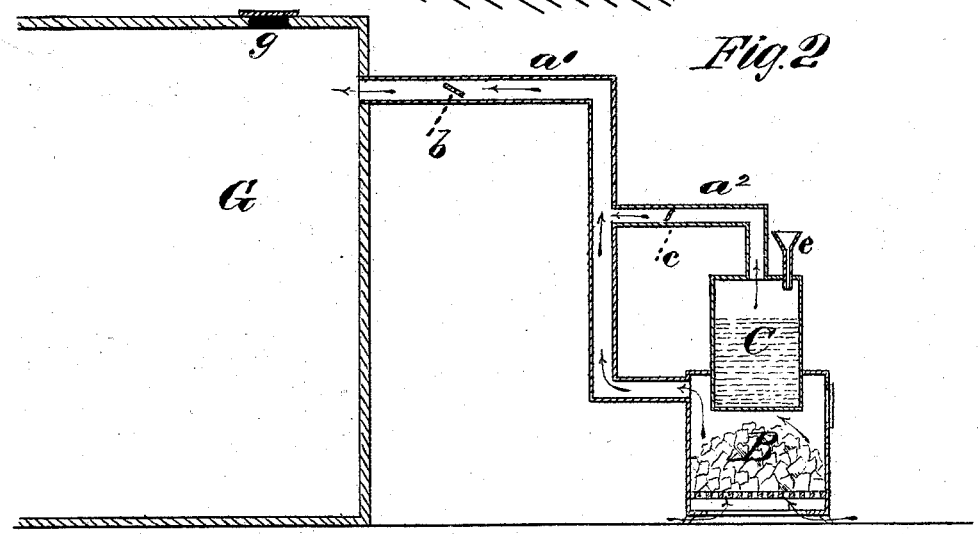

Figure 1, Plate 1, shows one form of apparatus for manufacturing stone artificially. Fig. 2, Plate 1, and Fig. 3, Plate 2, show modifications of Fig. 1.

Similar letters of reference indicate corresponding parts in the several figures.

This invention relates to an apparatus for the artificial treatment of lime, hydraulic cements, and other substances or combination of substances which will harden and become stone when subjected to the action of carbonic-acid gas mingled with vapors of fluids, as will be hereinafter explained.

The following description of my invention will enable others skilled in the art to understand it.

In the accompanying drawing, Fig. 1, A represents a pit, which is constructed below the surface of the ground, for the purpose of containing a carbonic-acid generator and a steam or vapor generator. The gas-generator B is a simple furnace in which charcoal is burned, which furnace is supplied with air by means of an inclined passage, E. The furnace is open at its top and supports a boiler, C, by means of lugs, or in any other suitable manner. Into the boiler C water is put for the purpose of generating vapor. It will be seen that I here produce vapor by heat of the same furnace in which the gas is generated. There is a space between the boiler or evaporating-pan C and the hinged cover D of the pit A, in which the carbonic-acid gas and the watery particles mix before they enter an apartment, G, which they do through a passage, $a$, as indicated by the arrows in Fig. 1. The material to be hardened is put into the chamber G, and here subjected to the action of the gas, which it absorbs. At the top of the chamber G is a hole which is provided with a movable cover, $g$, for the purpose of allowing air or steam to escape when desired, and, if necessary, may be used as a draft-passage in first starting the fire.

In Fig. 2 I have represented a slight modification of the apparatus of Fig. 1, wherein the gas and steam or vapor generators are arranged on the surface of the ground. Under this modification I provide a furnace, B, for burning charcoal, at the top of which is a vapor-generator, C. A pipe, $a^1$, leads from the furnace B and conducts the gas generated therein into the chamber G, and a pipe, $a^2$, leads from the generator C into the pipe $a^1$, and conducts the vapor or steam therein. Both pipes $a^1$ and $a^2$ are provided with valves for regulating the discharge from the two generators.

It will be seen that I mix the gas and vapor in pipe $a^1$, on their way into the chamber G, and before they enter the latter, thus thoroughly charging the watery particles with the gas.

Figure 3:
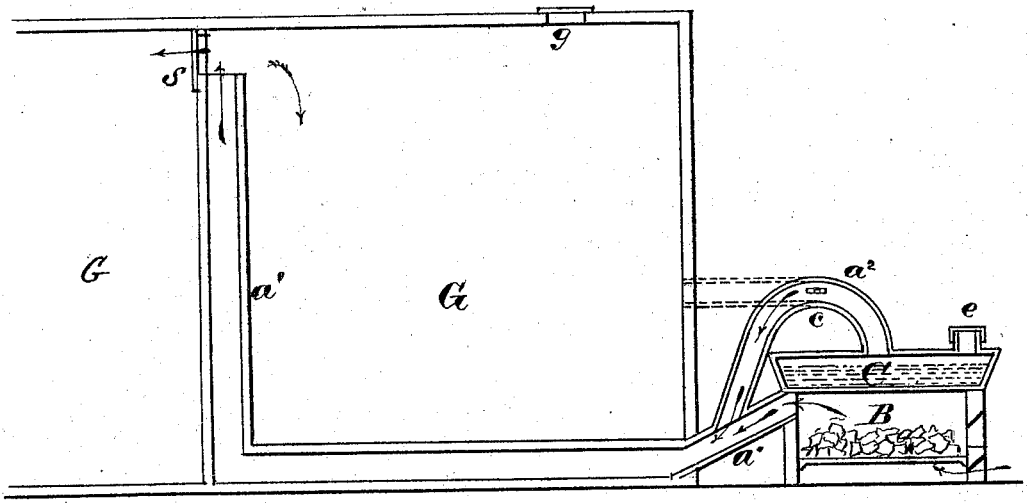

In Fig. 3 I show a gas-generating furnace, B, and a vapor-generator, C, with pipes $a^1$ and $a^2$ leading into the chamber G, which parts are constructed and operate substantially as shown in Fig. 1. Under this modification the pipe $a^1$ is carried along the floor of the chamber G and upward nearly to the roof of this chamber, where the gas and vapor escape into the chamber.

Instead of the vapor-pipe $a^2$ entering the gas-pipe $a^1$, this pipe $a^2$ may be carried directly into the chamber G, so that the vapor will not mix with the gas until they both get into this chamber G; and instead of conducting the gas and vapor together entirely through the cooling medium, the gas alone may be conducted through this medium and the vapor introduced into the gas-pipe near its outlet or at any other suitable point.

I have also represented in Fig. 3 two hardening-chambers with a communication, S, between their division-wall, (which may be provided with a valve,) so that the chambers can be charged separately or together. In this way any desired number of chambers may communicate with the generators.

I have thus described three different forms of apparatus with which my hardening process may be conducted, but other modifications of their construction may be adopted, as convenience may dictate, without altering their principle of operation; and therefore, I do not confine myself strictly to the precise forms and arrangements herein shown.

Having described my invention, what I claim as new, and desire to secure by Letters Patent, is—

1. The apparatus, substantially as described, for mingling carbonic-acid gas with vapors of fluids in a chamber containing the material to be indurated, as set forth.

2. The combination, with an indurating-chamber, G, of a carbonic-acid generator and a vapor or steam generator, substantially as described.

3. The combination of a gas and vapor mixing pipe or passage, gas-generator, vapor-generator, and indurating-chamber, substantially as described.

JAMES L. ROWLAND.

Witnesses:
J. N. CAMPBELL,
JAMES MARTIN, Jr.